(12) United States Patent
Kumar et al.

(10) Patent No.: US 12,380,298 B2
(45) Date of Patent: Aug. 5, 2025

(54) MACHINE RECOGNITION CONFIDENCE-BASED VISUAL FEEDBACK DEVICES AND METHODS

(71) Applicant: ZEBRA TECHNOLOGIES CORPORATION, Lincolnshire, IL (US)

(72) Inventors: Sanjay Kumar, Bangalore (IN); Vikram B. Mangeshwar, Bangalore (IN); Kranthi Kumar Gadde, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/240,214

(22) Filed: Aug. 30, 2023

(65) Prior Publication Data

US 2025/0077812 A1    Mar. 6, 2025

(51) Int. Cl.
*G06K 7/10*        (2006.01)
*G06K 7/14*        (2006.01)

(52) U.S. Cl.
CPC ....... *G06K 7/10891* (2013.01); *G06K 7/1413* (2013.01); *G06K 7/1417* (2013.01); *G06K 2007/10534* (2013.01)

(58) Field of Classification Search
CPC ............. G06K 7/10891; G06K 7/1413; G06K 7/1417; G06K 2007/10534
USPC ........................................................ 235/462.1
See application file for complete search history.

(56) References Cited

U.S. PATENT DOCUMENTS

| | | | |
|---|---|---|---|
| 7,387,246 B2 | 6/2008 | Palestini et al. | |
| 2011/0073657 A1* | 3/2011 | Trajkovic | G06K 7/10722 235/462.25 |

OTHER PUBLICATIONS

RACO Industries, "Datalogic Scanner Green Spot Technology Demonstration", [https://www.youtube.com/watch?v=R_BEZHKz8D4], Retrieved on Aug. 30, 2023.

* cited by examiner

*Primary Examiner* — Daniel A Hess

(57) ABSTRACT

A method in a computing device includes: capturing, via a sensor, an image of an indicium; determining a confidence level associated with machine recognition of the indicium; based on the confidence level, selecting a feedback attribute; prior to outputting content encoded in the indicium, generating, via an output device, a feedback signal having the feedback attribute, wherein the attribute is configured to indicate a likelihood of success of a decode event to decode the content encoded in the indicium.

20 Claims, 6 Drawing Sheets

MACHINE RECOGNITION CONFIDENCE-BASED VISUAL FEEDBACK DEVICES AND METHODS

BACKGROUND

Data capture devices can be employed to capture images of machine-readable indicia such as barcodes, text, or the like, and obtain data from such images, e.g., by detecting and decoding barcodes. Successful extraction of data from machine-readable indicia by a data capture device, however, may be influenced by factors such as device positioning, lighting, or other environmental conditions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
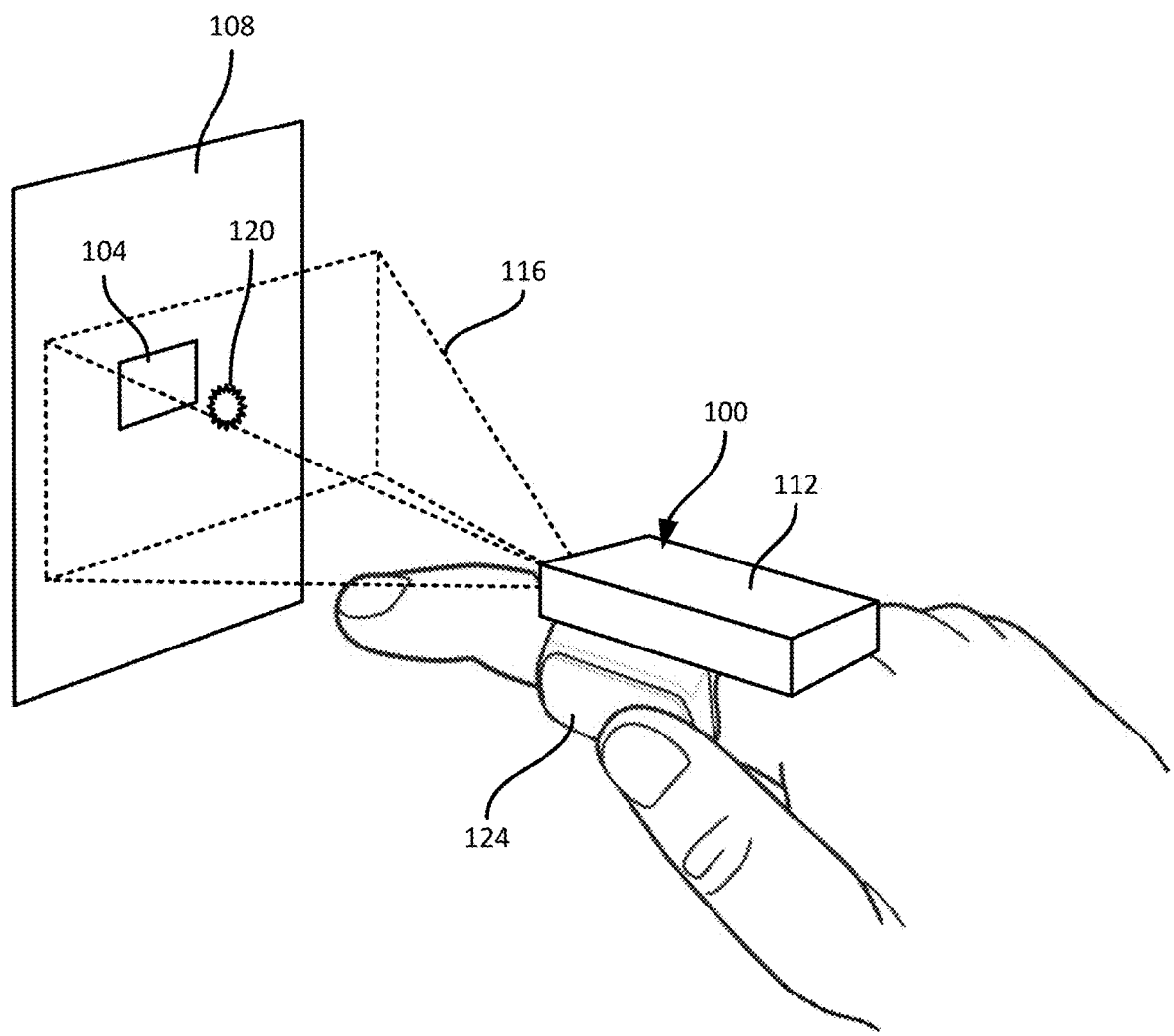
FIG. 1 is a diagram illustrating a data capture device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a computing device including: capturing, via a sensor, an image of an indicium; determining a confidence level associated with machine recognition of the indicium; based on the confidence level, selecting a feedback attribute; prior to outputting content encoded in the indicium, generating, via an output device, a feedback signal having the feedback attribute, wherein the attribute is configured to indicate a likelihood of success of a decode event to decode the content encoded in the indicium.

Additional examples disclosed herein are directed to a computing device, including: a sensor; an output device; and a processor configured to: capture, via the sensor, an image of an indicium; determine a confidence level associated with machine recognition of the indicium; based on the confidence level, select a feedback attribute; generate, via the output device, a feedback signal having the feedback attribute, wherein the attribute is configured to indicate a likelihood of success of a decode event to decode the content encoded in the indicium.

Further examples disclosed herein are directed to a method in a computing device including: controlling a light emitter to project an indicator light having a default visual attribute onto a surface carrying an indicium; capturing, via a sensor, an image of the indicium; determining a confidence level associated with machine recognition of the indicium; based on the confidence level, selecting a visual feedback attribute; controlling the light emitter to project an indicator light having the visual feedback attribute.

FIG. 1 illustrates a computing device 100 configured to capture images of indicia, such as an indicium 104 carried on a surface 108, and perform a machine recognition operation to detect and extract information from the indicium 104. The indicium 104 can include a barcode, such as a linear or one-dimensional barcode (e.g., Code 128, EAN-8, or the like), or a two-dimensional barcode (e.g., QRCode, DataMatrix, or the like), and the computing device 100 can be configured to detect and decode such a barcode. In other examples, the indicium 104 can include text (e.g., alphanumeric characters printed or otherwise affixed to the surface 108), and the computing device 100 can be configured to detect the text and perform optical character recognition (OCR) to extract machine-readable representations of the text (e.g., Unicode representations of the text contained in the indicium 104). The surface 108 can include a surface of a parcel, a sheet of paper or other suitable material, a shelf edge, or the like.

The computing device 100 is illustrated as a hand-worn data capture device, such as a ring scanner, in this example. In other examples, however, the computing device 100 can be implemented in various other form factors, including as a tablet computer, a smart phone, a scanner with a pistol-grip handle assembly, and the like. The device 100 includes a housing 112 containing various other components of the device 100, including a sensor configured to capture images within a field of view (FOV) 116. The device 100 is configured, via the performance of one or more machine recognition operations, to detect indicia within such images, and under certain conditions, to decode or otherwise extract information from detected indicia (e.g., barcode decoding and/or OCR processing).

The device 100 can also include a light emitter configured to project an indicator light 120, for example into the FOV 116 (e.g., substantially centered within the FOV 116 as illustrated in FIG. 1). The indicator light 120 can be, as shown in FIG. 1, a dot or other suitable shape occupying a relatively small portion of the FOV 116 (e.g., less than about ten percent of the FOV 116, although a wide variety of indicator light sizes can be employed in other examples). The indicator light 120 can be employed to assist in aiming the device 100 to place the indicium 104 within the FOV 116 for data capture. The device 100 can further include an input 124 such as a button, trigger, capacitive sensor, or the like. The input 124 can be activated by an operator of the device 100 (e.g., on whose hand the device 100 is worn, in this example) to trigger a decode event, e.g., to extract and output content from detected indicia in the image. For example, the device 100 can capture a stream of images, and can process each image to automatically detect any indicia therein. When indicia are detected in an image, the device 100 can attempt to decode the detected indicia, e.g., in response to activation of the input 124. In the absence of a machine recognition output trigger such as an activation of the input 124, however, the device 100 may discard any data extracted from the images. In response to a machine recognition output trigger, the device 100 can provide such extracted data to another computing device and/or to an application executing on the device 100 for further processing.

In other words, in operation the device 100 can continuously detect indicia in captured images. In response to periodic machine recognition output triggers such as activations of the input 124, the device 100 can further initiate decode events to attempt to extract machine-recognized data (also referred to as content) from the detected indicia on the surface(s) within the FOV 116, and output such content for further use. Depending on the lighting conditions, the distance between the device 100 and the surface 108, the position of the indicium 104 within the FOV 116, and various other factors, however, the indicium 104 may sometimes be difficult to detect and/or decode in an image captured by the device 100. If the input 124 is activated when the indicium 104 was not successfully detected, or was detected with low confidence, in the image most recently captured by the device 100, the device 100 may be unable to produce machine recognition output. That is, a decode event may fail. Repositioning the device 100 relative to the indicium 104 may increase the likelihood of successful data capture from the indicium 104.

Data capture devices may produce confidence levels associated with each processed image, and such confidence levels can be used to provide feedback to an operator of the device 100, e.g., prompting the operator to reposition the device 100 before activating the input 124. The device 100 lacks a display, however, and therefore may not readily present such feedback to the operator. Other computing devices may include displays on which a current machine recognition confidence level can be presented, but the displays may be small (e.g., in the case of a wrist-mounted scanner), or the displays may be oriented so as to be difficult to read when the device is used as a data capture device.

The device 100 therefore implements additional functionality to present readily perceptible (e.g., visible, audible, or the like) feedback to an operator that is indicative of current machine recognition confidence, e.g., a confidence level associated with detection of an indicium in an image. The device 100 can present feedback by controlling visual attributes of the indicator light 120 based on machine recognition confidence levels, or by controlling attributes of other feedback signals, such as audible signals, haptic feedback, or the like. Such perceptible feedback can lead to reduced scan times, e.g., by reducing a number of unsuccessful decode events initiated by machine recognition output triggers.

Figure 2:
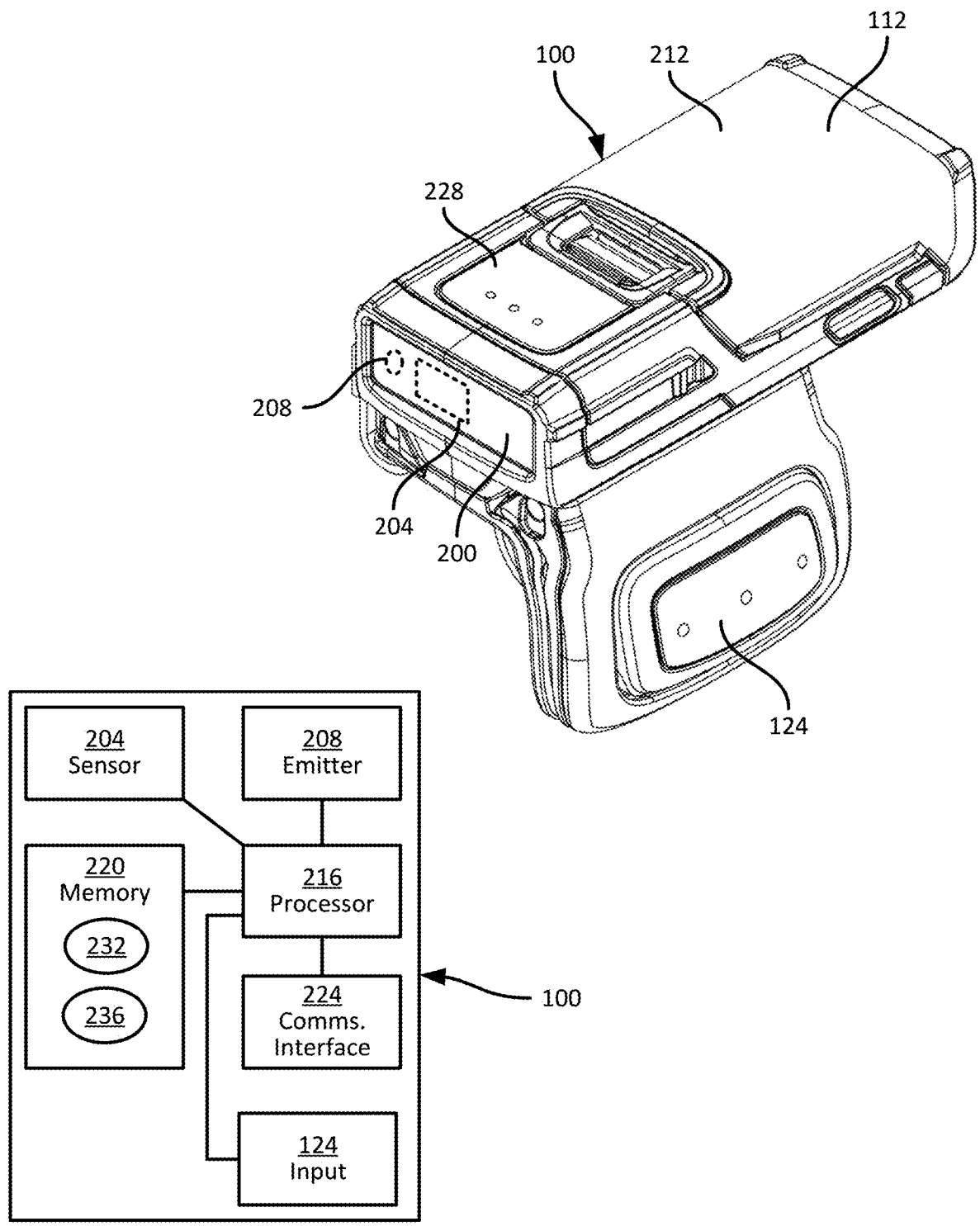
FIG. 2 is a diagram illustrating the data capture device of FIG. 1 and certain internal components of the data capture device.

FIG. 2 illustrates the device 100 and certain internal components of the device 100. As shown in FIG. 2, the device 100 can include a scan window 200, behind which are disposed a sensor 204, such as an image sensor (e.g., a complementary metal-oxide-semiconductor, or CMOS, sensor) and a light emitter 208. The sensor 204 defines the FOV 116 shown n FIG. 1, and is configured to capture images for processing, e.g., to detect the indicium 104 and perform machine recognition operations thereon. The light emitter 208 can include a light emitting diode (LED), such as a laser diode, configured to project the indicator light 120 into the FOV 116 to assist an operator of the device 100 in aiming the FOV 116 at the indicium. The indicator light 120 can therefore be within the visible spectrum, although the specific color of the indicator light 120, as well as other visual attributes discussed below, can vary. In other examples, the indicator light 120 need not be projected into the center of the FOV 116, but can be projected to another portion of the FOV 116. In further examples, the device 100 can include another light emitter, such as an LED or the like disposed on an upper surface 212 of the housing 112, for providing visual feedback. The device 100 can further include, in other examples, other emitters such as a speaker, and/or a motor for generating haptic feedback.

The device 100 includes a processor 216, such as a central processing unit (CPU), graphics processing unit (GPU), and/or other suitable control circuitry, microcontroller, or the like. The processor 216 is interconnected with a non-transitory computer readable storage medium, such as a memory 220. The memory 220 includes a combination of volatile memory (e.g. Random Access Memory or RAM) and non-volatile memory (e.g. read only memory or ROM, Electrically Erasable Programmable Read Only Memory or EEPROM, flash memory). The memory 220 can store computer-readable instructions, execution of which by the processor 216 configures the processor 216 to perform various functions in conjunction with certain other components of the device 100. The device 100 can also include a communications interface 224 enabling the device 100 to exchange data with other computing devices, e.g. via various networks, short-range communications links, and the like. As shown in FIG. 2, the processor 216 is also interconnected with the sensor 204, the emitter 208, and the input 124.

In some examples, the device 100 can include a further input, such as a trigger 228 disposed on the upper surface 212. The device 100 can include other input and/or output devices, such as microphones, keypads, and the like. As noted earlier, in other examples, the device 100 can also include a display, which can be integrated with a touch screen.

The computer-readable instructions stored in the memory 220 for execution by the processor 216 include a machine recognition application 232, and a downstream application 236. When executed by the processor 216, the application 232 configures the device 100 to capture a stream of images via the sensor, and to project the indicator light 120 into the FOV 116 during capture of the image stream. Further, the application 232 configures the device 100 to generate feedback signals, e.g., by controlling the visual appearance of the indicator light 120, and/or by controlling audible and/or haptic output, based on a confidence level associated with machine recognition of the indicium 104 (or any other suitable indicia) within the captured stream of images. The confidence level can correspond to the detection of an indicium in the captured image. The appearance of the indicator light 120 and/or the nature of other feedback signals can therefore vary over time to indicate a current confidence level associated with machine recognition of the indicium 104, for example to indicate advantageous times to output data extracted from the indicium 104. Each feedback signal, in other words, is configured to indicate a likelihood of success of a decode event to decode the content encoded in a detected indicium.

The application 236, when executed by the processor 216, can configure the device 100 to initiate execution of the application 232 (e.g., also referred to as initiating a scan session) and being capturing and processing the above-mentioned image stream. The application 236 can also be a recipient of a current machine recognition result from the application 232, e.g., when the input 124 is activated. The application 236 can process the result, e.g., by transmitting the result to another computing device, retrieving price or other stock-keeping information associated with the result from a database, or the like. In further examples, either or both of the applications 232 and 236 can be implemented by one or more specially designed hardware and firmware components, such as FPGAs, ASICs and the like.

Figure 3:
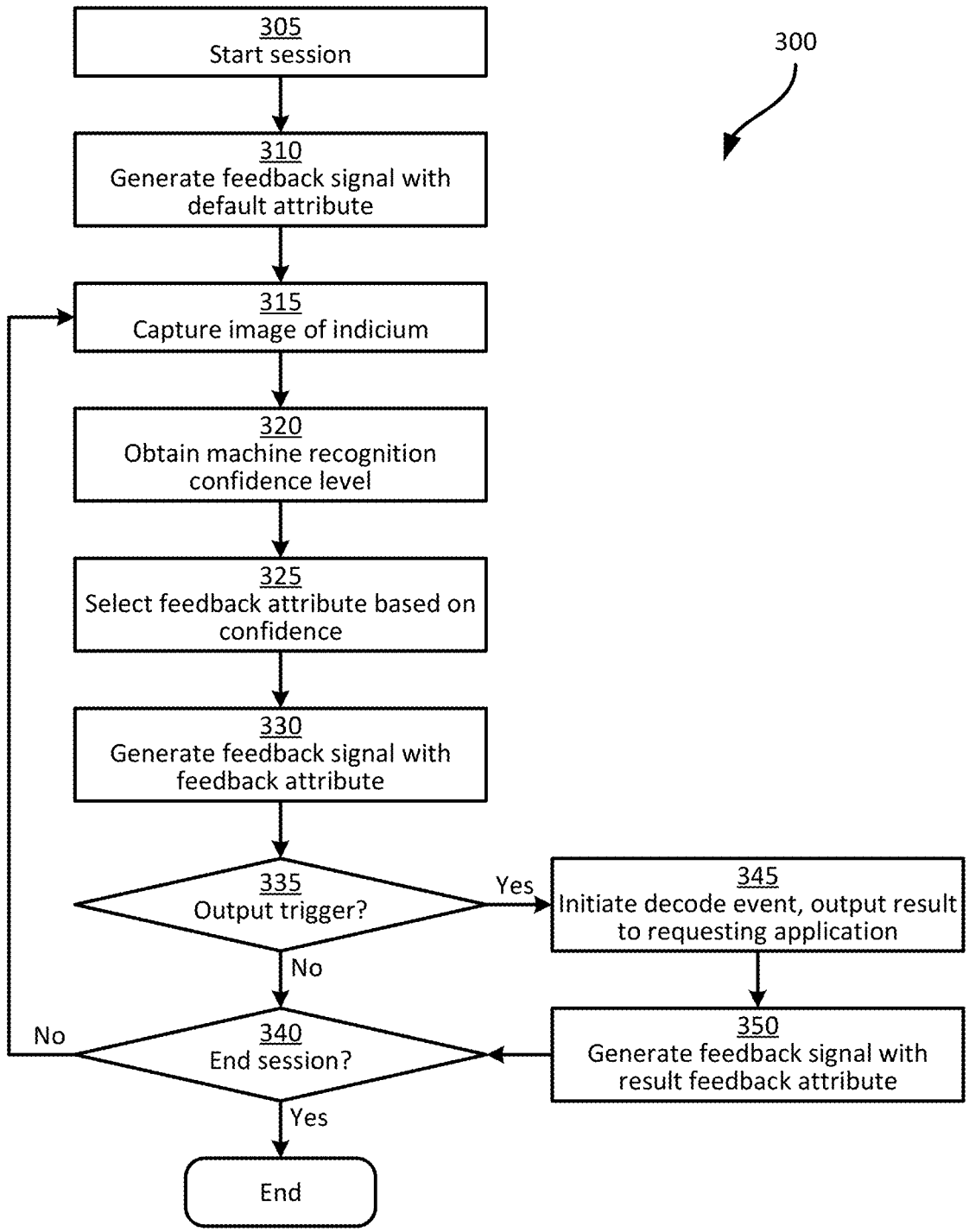
FIG. 3 is a flowchart of a method of machine recognition confidence-based visual feedback for data capture devices.

Turning to FIG. 3, a method 300 of machine recognition confidence-based feedback is illustrated. The method 300 is described below in conjunction with its performance by the device 100, e.g., to extract data from the indicium 104. The method 300 can also be performed by a wide variety of other computing devices with sensors and output devices such as light emitters functionally similar to the sensor 204 and the light emitter 208.

At block 305, the device 100 is configured to initiate a scan session, also referred to as a capture session. As noted above, initiation of a scan session can include beginning execution of the application 232. A scan session can be initiated, for example, in response to an initiation command from the application 236, e.g., requesting a decode or other machine recognition operation. In other examples, the device 100 can automatically execute the application 232 on start-up.

During a scan session, the device 100 is configured to capture a stream of images via the sensor 204, while projecting the indicator light 120 into the FOV 116 of the sensor 204. The images can be captured at a suitable frame rate, for example that provides substantially real-time capture and machine recognition (e.g., about ten frames per second, although higher or lower frame rates can also be implemented depending on the computational resources available at the device 100). The indicator light 120 can be projected substantially continuously throughout the capture session.

At block 310, the device 100 can be configured to generate a feedback signal with a default feedback attribute. For example, the device 100 can be configured to project the indicator light 120 with a default visual attribute. The default visual attribute can be stored in the memory 220, for example as configuration data within or associated with the application 232. The default visual attribute can indicate that no confidence measurement associated with machine recognition of the indicium 104 (e.g., corresponding to confidence in a detection of an indicium) is available, or that confidence is low (e.g., that detection confidence is low and therefore that a decode event initiated by a machine recognition output trigger is currently unlikely to provide extracted data). The default visual attribute can, in other words, be distinct from confidence-based visual attributes, or can be the same visual attribute as a visual attribute indicating low machine recognition confidence, as discussed below. In examples where the feedback signal is audible, the default attribute can be, for example, an audible tone with a default frequency, a periodic audible beep, an audible recording indicating that no confidence level is available or the like.

At block 315, the device 100 is configured to capture an image, e.g., of the indicium 104 and a portion of the surface 108. At block 320, the device 100 is configured to obtain a confidence level associated with machine recognition of the indicium 104 and/or any other indicia in the captured image from block 315. Obtaining the confidence level can include, for example, processing the image from block 315 via a segmentation algorithm and/or any other suitable detection algorithm to determine the position of the indicium in the image (e.g., in the form of a bounding box). Obtaining the confidence level can include executing a detection algorithm with the image as an input. Detection algorithms can implement machine learning models, such as deep neural networks (e.g., You Only Look Once or other convolutional neural networks) or the like. Such models produce as output, for example, a bounding box encompassing a likely barcode, block of text, or the like. The machine recognition algorithm can also produce as output a confidence level, indicating a likelihood, score, or other measurement of the accuracy of the bounding box, the likelihood that the bounding box contains text, a barcode, or the like. The confidence level can be expressed as a percentage, a fractional value between zero and one, or in any other of a wide variety of ranges.

At block 325, the device 100 is configured to select a feedback attribute for an output device, such as a visual feedback attribute for the indicator light 120, based on the confidence level from block 320. The visual feedback attribute is a visual attribute of the indicator light, such as a color, an intensity (e.g., a brightness), a flashing frequency, or the like. Other visual feedback indicators, such as a beam width (affecting the portion of the FOV 116 occupied by the indicator light 120), can also be used as visual feedback attributes. The selection at block 325 can be based on configuration data stored in the memory 220, e.g., as a component of the application 232. Other feedback attributes are also contemplated, such as audible feedback attributes including a recording of the current confidence level (e.g., rendered via text-to-speech algorithms or the like), a tone or beep with a frequency corresponding to the confidence level, or the like).

Figure 4:
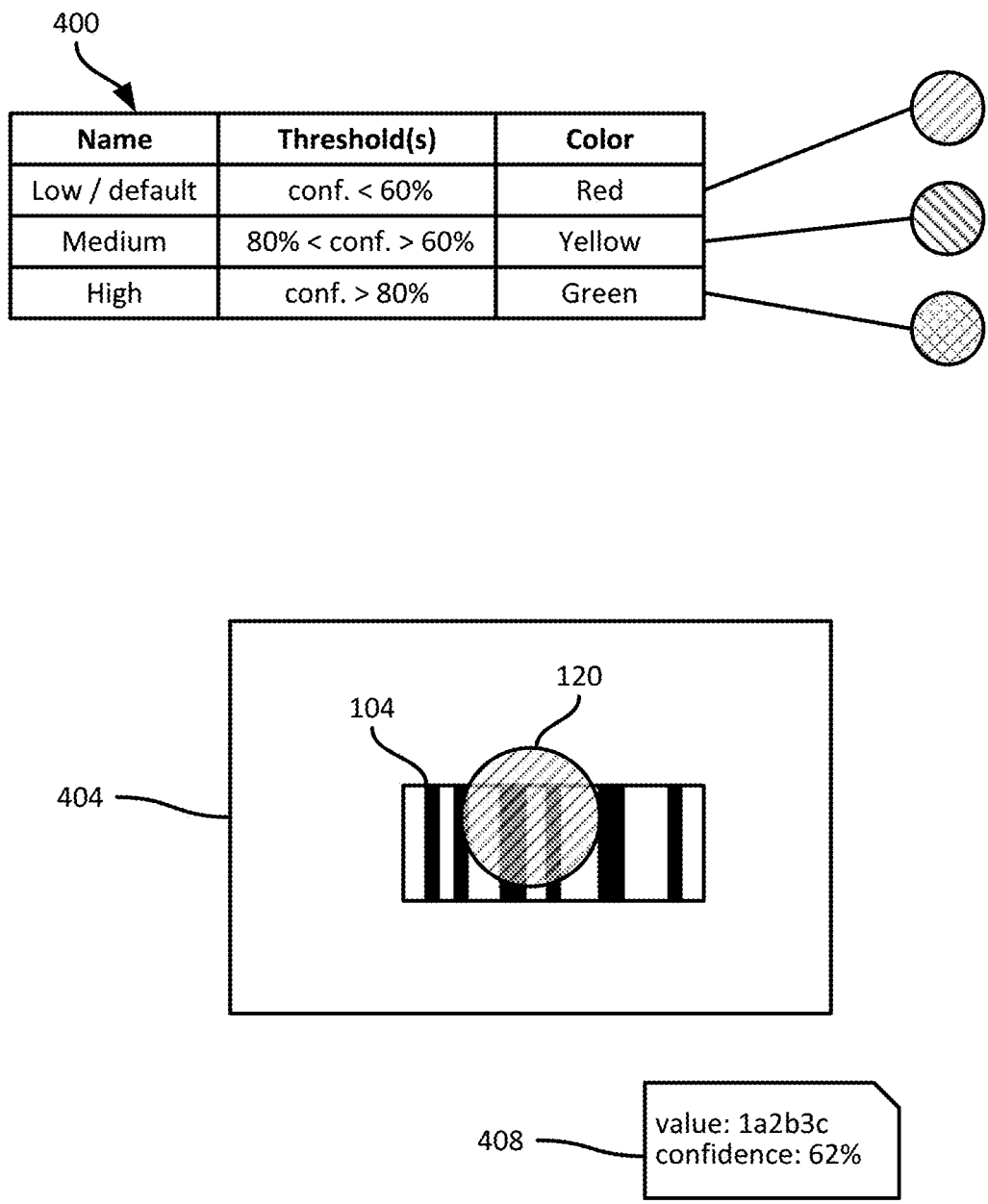
FIG. 4 is a diagram illustrating an example performance of blocks 315 to 330 of the method of FIG. 3.

At block 330, having selected a visual feedback attribute (or other perceptible feedback attribute) corresponding to the current confidence level (e.g., the confidence level obtained from the most recent performance of block 320), the device 100 is configured to control an output device to generate a feedback signal having the selected feedback attribute. For example, the device 100 can project the indicator light 120 with the selected visual feedback attribute. Turning to FIG. 4, an example performance of blocks 315 to 330 is illustrated.

FIG. 4 illustrates configuration settings 400 as noted above. In the illustrated example, the settings 400 include three visual feedback attributes, corresponding to three distinct colors for the indicator light 120 (e.g., red, yellow, and green). A wide variety of other colors can also be employed, and the settings 400 can define as few as two, or more than three, visual feedback attributes. In this example, a confidence level below 60% leads to the selection of the color red at block 325 as a visual feedback attribute. The color red is also selected at block 310 as a default visual feedback attribute, when block 310 is implemented. The color yellow is selected as a visual feedback attribute when the confidence level is between 60% and 80%, and the color green is selected when the confidence level is above 80%. More generally, a given visual feedback attribute can be selected when the confidence level does not exceed a predetermined threshold, and a different visual feedback attribute can be selected when the confidence level exceeds the predetermined threshold. Further thresholds can be defined in the settings 400 to implement more granular control of the indicator light 120.

FIG. 4 illustrates an image 404 of the indicium 104, including the indicator light 120 with the default visual attribute in this example. From the image 404, at block 320 the device 100 obtains machine recognition data 408 such as a decoded value from the indicium 104, and a confidence level (e.g., 62%). The confidence level is above the lower threshold of 60% shown in the settings 400, and below the upper threshold of 80%, and the device 100 therefore selects the color yellow at block 325. Control of the emitter 208 at block 330 therefore projects the indicator light 120 as a yellow light, replacing the default red light shown in the image 404.

Returning to FIG. 3, at block 335 the device 100 is configured to determine whether an output trigger has been detected. An output trigger can include an activation of the input 124, or another suitable input received at the device 100, corresponding to a command to provide machine recognition data to the application 236. In other examples, the output trigger can be automatically generated by the application 232, for example by comparing the confidence level from block 320 to an output trigger threshold (e.g., 90%, although various other thresholds can also be employed) and initiating a decode event to extract and provide content decoded or otherwise extracted from detected indicia to the application 236 if the confidence level exceeds the output threshold.

When the determination at block 335 is negative, the device 100 is configured to determine, at block 340, whether to end the capture session. The determination at block 340 can include a determination of whether an input has been received to shut the device 100 down, to cease execution of the application 232, or the like. When the determination at block 340 is affirmative, performance of the method 300 ends. Otherwise, the device 100 returns to block 315 to capture a further image and repeat blocks 320-335. In other examples, block 340 can be omitted, and the device 100 can simply return from block 335 to block 315 upon a negative determination at block 335.

Figure 5:
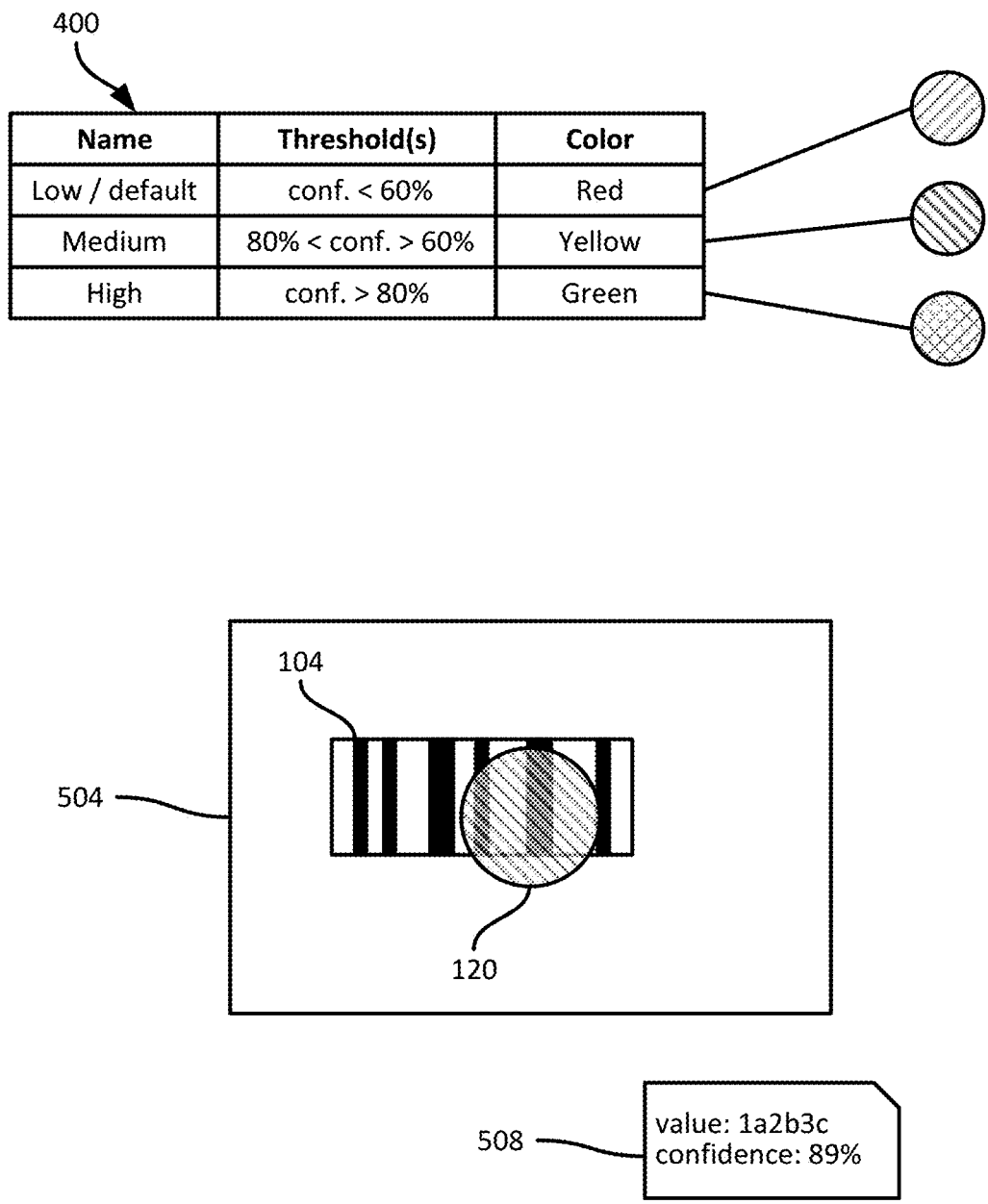
FIG. 5 is a diagram illustrating another example performance of blocks 315 to 330 of the method of FIG. 3.

Turning to FIG. 5, another example performance of blocks 315 to 330 is shown. Subsequent to capture of the image 404 and updating of the visual appearance of the indicator light 120 (and/or updating any other perceptible feedback signal) as discussed in connection with FIG. 4, the device 100 captures a further image 504, in which the device 100 has been repositioned relative to the indicium 104. As seen in FIG. 5, the indicator light 120 has the visual attribute selected at the previous performance of block 325 (yellow, in this case). The device 100, at block 320, decodes a value "1a2b3c" from the indicium 104, associated with a confidence level of 89%. At block 325, therefore, the device 100 selects the color green as the visual feedback attribute, as the confidence level in the machine recognition data 508 exceeds the upper threshold of 80% defined in the settings 400. At block 330, therefore, the device 100 controls the emitter 208 to project a green indicator light 120 into the FOV 116.

Referring again to FIG. 3, when the determination at block 335 is affirmative, the device 100 proceeds to block 345, initiates a decode event, and outputs a machine recognition result (e.g., content 408 or 508, or an error if the decode event fails) to the application 236 for further processing. In some cases, e.g., if the confidence level associated with machine recognition of the indicium 104 is too low (e.g., below the threshold of 60% shown in the settings 400), the machine recognition result provided at block 345 may not include a decoded value or extracted string of text, but may instead include the confidence level and/or a failure indicator, indicating that the decode event triggered at block 335 was unsuccessful.

Following block 345, at block 350 the device 100 can be configured to control an output device such as the emitter 208 to generate a result feedback signal with a result feedback attribute, e.g., to project the indicator light with a result visual feedback attribute, e.g., indicating whether the decode event initiated by the output trigger led to successful provision of decoded data to the application 236, or whether decoding failed. The settings 400, for example, can include additional settings for result visual attributes, as described below. Following block 350, the device 100 proceeds to block 340, or directly to block 315. In other examples, block 350 can be omitted.

Figure 6:
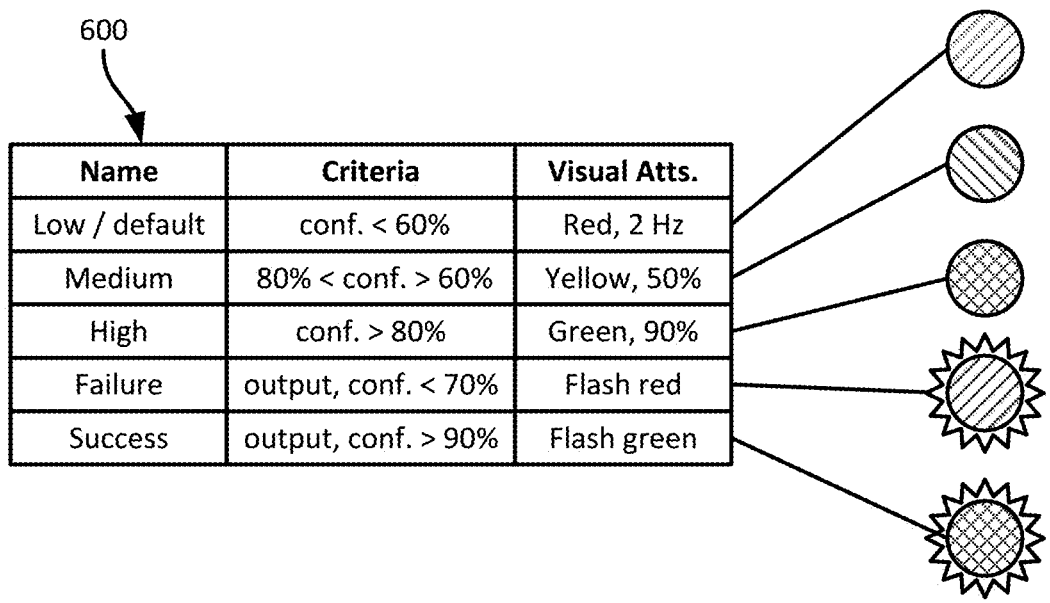
FIG. 6 is a diagram illustrating further example configuration settings for use in the method of FIG. 3.

FIG. 6 illustrates further example configuration settings. In some examples, settings 600 can specify, in addition to or instead of colors for the indicator light 120, flashing frequencies. For example, the settings 600 include a low-confidence or default setting by which the indicator light 120 is red, and flashes at a frequency of 2 Hz. The visual attributes for medium and high confidence, meanwhile, are indicated without frequencies, meaning that they are solid. Further, the settings 600 define result visual feedback attributes for successful and failed decode events at block 350. In this example, a successful decode event (e.g., in which the confidence level is above 90% and a decoded or extracted value is returned to the application 236) results in a green indicator light that flashes once, and then remains solid. A failed decode event (e.g., in which the confidence level is below 70% and a failure indication is returned to the application 236) results in a red indicator light 120 that flashes once, and then remains solid.

Various other visual attributes can also be specified. For example, the settings 600 indicate that the medium confidence visual attribute has an intensity of 50%, while the high confidence visual attribute has an intensity of 90%. In other examples, intensity, flashing frequency, and color can be combined in other ways than those shown, or can be used individually (e.g., such that a color of the indicator light 120 remains constant, but an intensity changes with machine recognition confidence). In still other examples, rather than discrete thresholds, at block 325 the device 100 can select a visual feedback attribute such as intensity, flashing frequency, or color from a sequence of colors, proportional to the confidence level.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a computing device, the method comprising:
   capturing, via a sensor, an image of an indicium;
   determining a confidence level associated with machine recognition of the indicium;
   based on the confidence level, selecting a feedback attribute;
   prior to outputting content encoded in the indicium, generating, via an output device, a feedback signal having the feedback attribute, wherein the attribute is configured to indicate a likelihood of success of a decode event to decode the content encoded in the indicium.

2. The method of claim 1, further comprising: prior to capturing the image of the indicium, retrieving a default attribute and generating, via the output device, the feedback signal having the default attribute.

3. The method of claim 1, wherein the output device is a light emitter, and wherein generating the feedback signal includes projecting an indicator light having the feedback attribute.

4. The method of claim 3, wherein projecting the indicator light comprises projecting the indicator light into an aiming region of a field of view of the sensor.

5. The method of claim 3, wherein the feedback attribute includes one or more attributes selected from the group consisting of:
   a color,
   an intensity, and
   a flashing frequency.

6. The method of claim 1, wherein selecting the feedback attribute comprises:
   selecting a first feedback attribute when the confidence level exceeds a predetermined threshold; and
   selecting a second feedback attribute when the confidence level does not exceed the predetermined threshold.

7. The method of claim 1, further comprising:
   initiating a decode event;
   in response to the decode event, outputting content decoded from the image of the indicium to an application executing at the computing device.

8. The method of claim 7, further comprising:
   in response to the decode event, selecting a result feedback attribute; and
   generating, via the output device, the feedback signal having the result feedback attribute.

9. The method of claim 8, wherein the feedback attribute includes one of color, intensity, or flashing frequency, and wherein the result feedback attribute includes another one of color, intensity, or flashing frequency.

10. A computing device, comprising:
    a sensor;
    an output device; and
    a processor configured to:
      capture, via the sensor, an image of an indicium;
      determine a confidence level associated with machine recognition of the indicium;
      based on the confidence level, select a feedback attribute;
      generate, via the output device, a feedback signal having the feedback attribute, wherein the attribute is configured to indicate a likelihood of success of a decode event to decode content encoded in the indicium.

11. The computing device of claim 10, wherein the processor is further configured to: prior to capturing the image of the indicium, retrieve a default attribute and generate, via the output device, the feedback signal having the default attribute.

12. The computing device of claim 10, wherein the output device is a light emitter, and wherein generating the feedback signal includes projecting an indicator light having the feedback attribute.

13. The computing device of claim 12, wherein the processor is configured to project the indicator light by projecting the indicator light into an aiming region of a field of view of the sensor.

14. The computing device of claim 12, wherein the feedback attribute includes one or more attributes selected from the group consisting of:
  a color,
  an intensity, and
  a flashing frequency.

15. The computing device of claim 10, wherein the processor is configured to select the feedback attribute by:
  selecting a first feedback attribute when the confidence level exceeds a predetermined threshold; and
  selecting a second feedback attribute when the confidence level does not exceed the predetermined threshold.

16. The computing device of claim 10, wherein the processor is further configured to:
  initiate a decode event;
  in response to the decode event, output content decoded from the image of the indicium to an application executing at the computing device.

17. The computing device of claim 16, wherein the processor is further configured to:
  in response to the decode event, select a result feedback attribute; and
  control the output device to generate the feedback signal having the result feedback attribute.

18. The computing device of claim 17, wherein the feedback attribute includes one of color, intensity, or flashing frequency, and wherein the result feedback attribute includes another one of color, intensity, or flashing frequency.

19. A method in a computing device, the method comprising:
  controlling a light emitter to project an indicator light having a default visual attribute onto a surface carrying an indicium;
  capturing, via a sensor, an image of the indicium;
  determining a confidence level associated with machine recognition of the indicium;
  based on the confidence level, selecting a visual feedback attribute;
  controlling the light emitter to project an indicator light having the visual feedback attribute.

20. The method of claim 19, further comprising:
  subsequent to the projecting, detecting a machine recognition output event; and
  in response to the machine recognition output event, outputting a machine recognition result derived from the image of the indicium to an application executing at the computing device.

* * * * *